US012110912B2

(12) United States Patent
Klopfenstein et al.

(10) Patent No.: US 12,110,912 B2
(45) **Date of Patent: *Oct. 8, 2024**

(54) SMART FLOW DUAL PUMP HYDRAULIC SYSTEM

(71) Applicant: CNH Industrial America LLC, New Holland, PA (US)

(72) Inventors: Matthew Klopfenstein, Chenoa, IL (US); Jerry L. Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,300

(22) Filed: Aug. 24, 2023

(65) Prior Publication Data

US 2023/0417260 A1 Dec. 28, 2023

Related U.S. Application Data

(63) Continuation of application No. 17/537,832, filed on Nov. 30, 2021, now Pat. No. 11,767,860.

(51) Int. Cl.
*F15B 11/17* (2006.01)
*E02F 9/22* (2006.01)
*F15B 11/16* (2006.01)

(52) U.S. Cl.
CPC ............ *F15B 11/17* (2013.01); *E02F 9/2242* (2013.01); *F15B 11/165* (2013.01); *E02F 9/2239* (2013.01);

(Continued)

(58) Field of Classification Search
CPC ....... F15B 11/161; F15B 11/165; F15B 11/17; E02F 9/2239; E02F 9/2242; E02F 9/2292;
(Continued)

(56) References Cited

U.S. PATENT DOCUMENTS 4,369,625 A 1/1983 Izumi et al.
5,148,676 A 9/1992 Moriya et al.
(Continued)

FOREIGN PATENT DOCUMENTS

DE 10 2006 019 703 A1 10/2007

*Primary Examiner* — Michael Leslie
(74) *Attorney, Agent, or Firm* — Rickard K. DeMille; Rebecca L. Henkel; Peter K. Zacharias

(57) ABSTRACT

A hydraulic system for a vehicle includes a first hydraulic pump including a first displacement actuator and a first pressure port, a first load sense system fluidly coupled to the first displacement actuator, a second hydraulic pump including a second displacement actuator and a second pressure port, a second load sense system fluidly coupled to the second displacement actuator, and a crossover pressure controller coupled between the first pressure port and the second pressure port. The crossover pressure controller reconfigurable between (a) a combined pressure configuration providing fluid communication between the first pressure port and the second pressure port and (b) a separate pressure configuration inhibiting fluid communication between the first pressure port and the second pressure port. The crossover pressure controller is actuatable independent of the first load sense system and the second load sense system.

19 Claims, 5 Drawing Sheets

(52) U.S. Cl.
CPC ............... *F15B 2211/20553* (2013.01); *F15B 2211/20576* (2013.01); *F15B 2211/515* (2013.01); *F15B 2211/526* (2013.01); *F15B 2211/605* (2013.01); *F15B 2211/6057* (2013.01); *F15B 2211/65* (2013.01); *F15B 2211/654* (2013.01)

(58) Field of Classification Search
CPC ........ E02F 9/2296; F04B 23/06; F04B 41/06; F04B 49/002
See application file for complete search history.

(56) References Cited

U.S. PATENT DOCUMENTS

| | | | |
|---|---|---|---|
| 5,692,377 | A | 12/1997 | Moriya et al. |
| 7,331,175 | B2 | 2/2008 | Verkuilen et al. |
| 7,992,384 | B2 | 8/2011 | Itakura et al. |
| 10,393,151 | B2 | 8/2019 | Ueda |
| 10,934,686 | B2 | 3/2021 | Horii |
| 10,955,052 | B2 | 3/2021 | Hoegerle et al. |
| 11,767,860 | B2 * | 9/2023 | Klopfenstein ........ E02F 9/2242 60/327 |

* cited by examiner

SMART FLOW DUAL PUMP HYDRAULIC SYSTEM

CROSS-REFERENCE TO RELATED PATENT APPLICATION

This application is a continuation of U.S. patent application Ser. No. 17/537,832, filed Nov. 30, 2021, which is incorporated herein by reference in its entirety.

BACKGROUND

The present disclosure relates generally to hydraulic systems for vehicles. More specifically, the present disclosure relates to multiple pump hydraulic system for vehicles.

SUMMARY

One embodiment relates to a hydraulic system for a vehicle. The hydraulic system includes a first hydraulic pump including a first displacement actuator and a first pressure port, a first load sense system fluidly coupled to the first displacement actuator, a second hydraulic pump including a second displacement actuator and a second pressure port, a second load sense system fluidly coupled to the second displacement actuator, and a crossover pressure controller coupled between the first pressure port and the second pressure port. The crossover pressure controller reconfigurable between (a) a combined pressure configuration providing fluid communication between the first pressure port and the second pressure port and (b) a separate pressure configuration inhibiting fluid communication between the first pressure port and the second pressure port. The crossover pressure controller is actuatable independent of the first load sense system and the second load sense system.

Another embodiment relates to a hydraulic system for a vehicle. The hydraulic system includes a first hydraulic pump including a first displacement actuator, a first pressure port, and a first load sense port, a first load sense system fluidly coupled to the first displacement actuator, a second hydraulic pump including a second displacement actuator, a second pressure port, and a second load sense port, a second load sense system fluidly coupled to the second displacement actuator, a crossover pressure valve positioned between the first pressure port and the second pressure port, and a crossover load sense valve positioned between the first load sense port and the second load sense port.

Still another embodiment relates to a hydraulic system for a vehicle. The hydraulic system includes a first hydraulic pump including a first displacement actuator, a first pressure port, and a first load sense port, a first load sense system fluidly coupled to the first displacement actuator, a second hydraulic pump including a second displacement actuator, a second pressure port, and a second load sense port, a second load sense system fluidly coupled to the second displacement actuator, a crossover pressure valve coupled between the first pressure port and the second pressure port, and a crossover load sense valve separate from the crossover pressure valve, the crossover load sense valve coupled between the first load sense port and the second load sense port.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
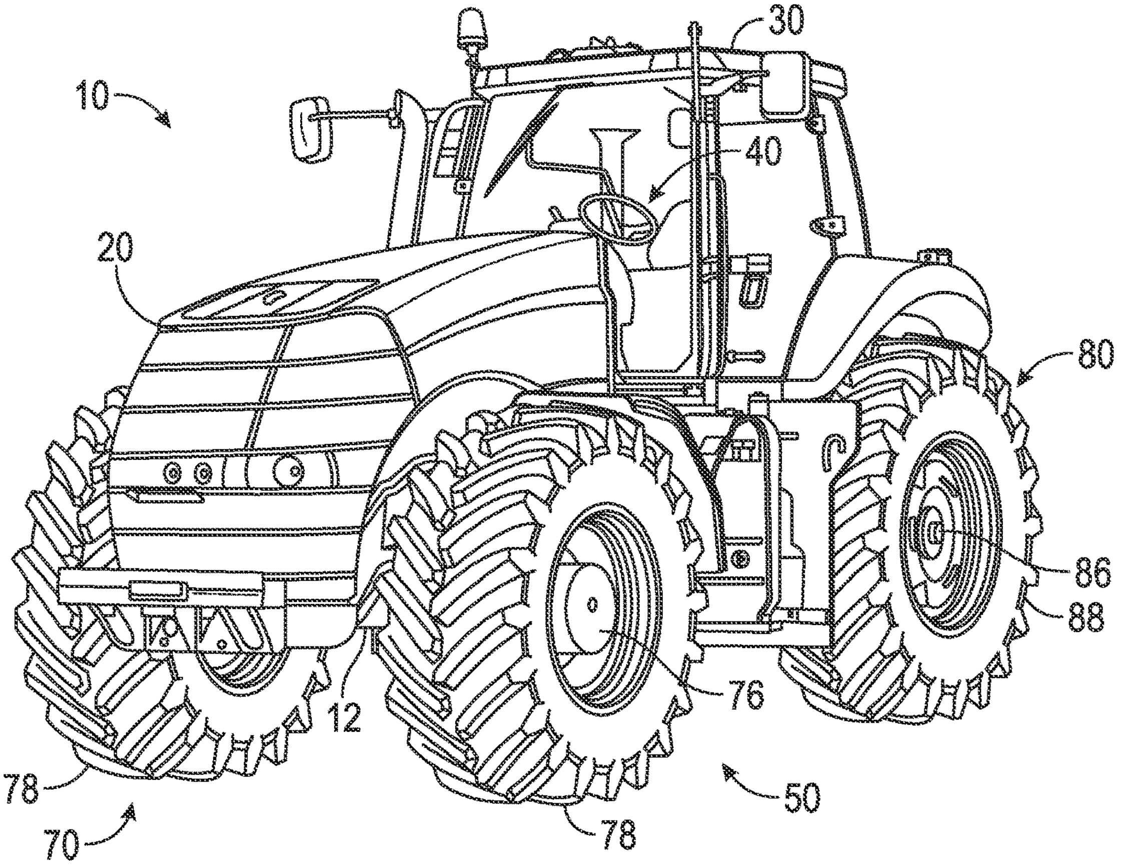
FIG. 1 is a perspective view of a vehicle, according to an exemplary embodiment.
Figure 2:
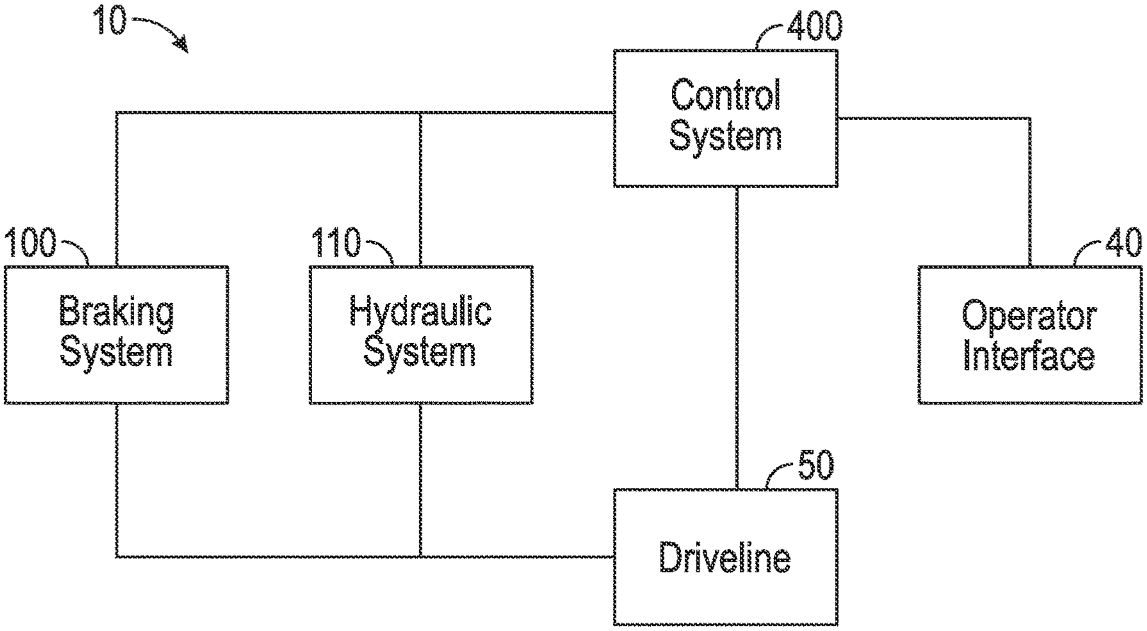
FIG. 2 is a schematic block diagram of the vehicle of FIG. 1, according to an exemplary embodiment.
Figure 3:
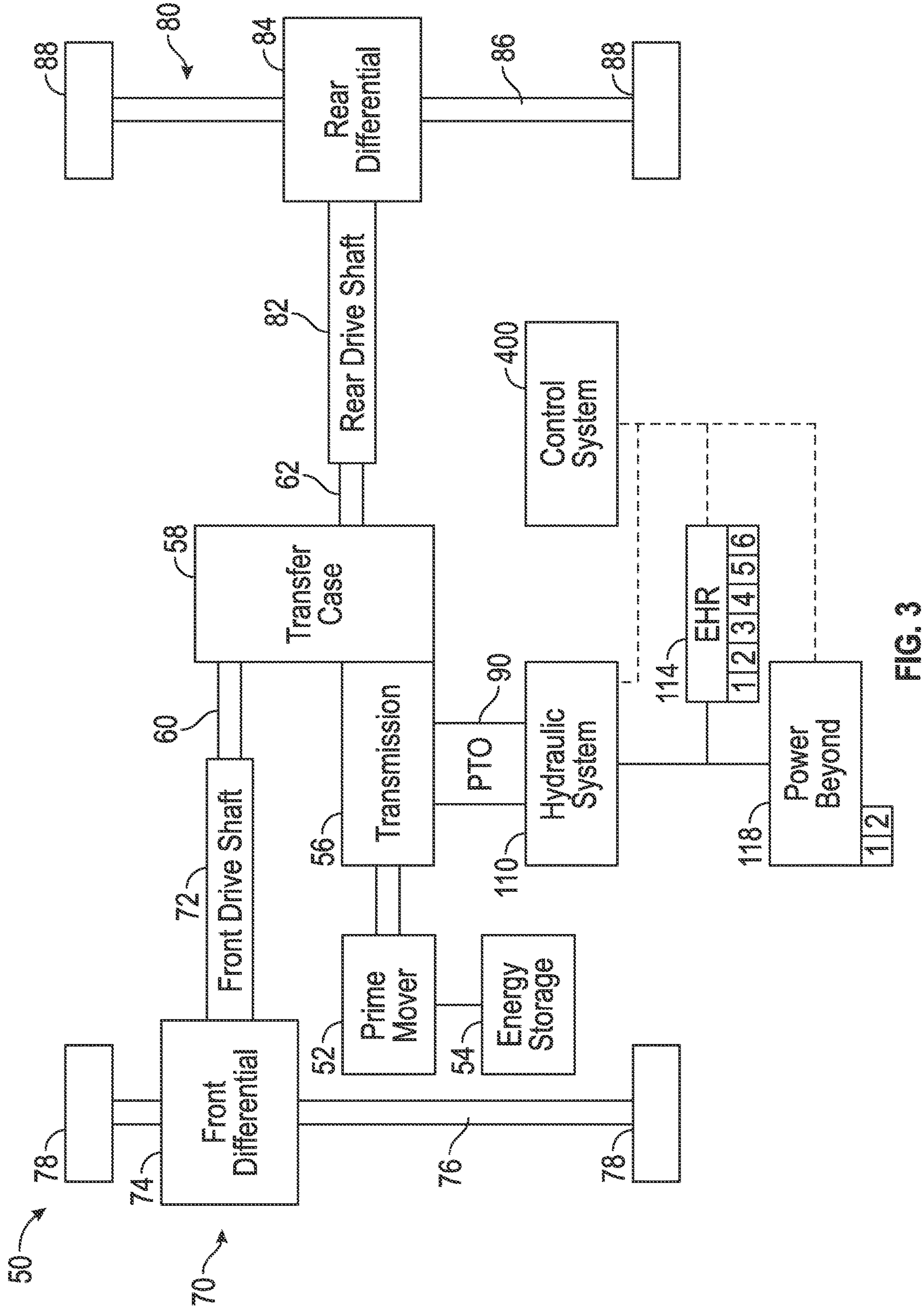
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; a hydraulic system 110 for providing hydraulic power to vehicle systems or coupled implements; and a vehicle control system, shown as control system 400, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., storing hydrogen, producing electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

With continues reference to FIG. 3, the hydraulic system 110 may be driven by the PTO 90 (e.g., a belt driven output, a shaft driven output, an electric motor output from an electronic PTO, etc.). In some embodiments, the hydraulic system 110 may be directly driven by the prime mover 52, by a secondary prime mover (e.g., an electric machine, an onboard generator set, etc.) or by another portion of the driveline 50.

In some embodiments, the hydraulic system 110 includes an electrohydraulic remote (EHR) system 114 including six EHR ports 114-1 through 114-6 that may be coupled to external implements. In some embodiments, the vehicle 10 includes three EHR ports 114-1 through 114-3. In some embodiments, the vehicle 10 includes more than six EHR ports 114-X or more than six EHR ports 114-X. The EHR system 114 can be used to provide selective control and variable hydraulic pressure to each of the EHR ports 114-1 through 114-6. In some embodiments, each EHR port 114-X includes a manually adjustable lever, screw or other interface that can be used to adjust the pressure provided to the EHR port 114-X. In some embodiments, the pressure provided to each EHR port 114-X can be adjusted via the operator interface 40 (e.g., a human machine interface, a touch screen, a joystick, etc.). The EHR system 114 also includes a load sense feature including one or more load sense ports. In some embodiments, each EHR port 114-X and each load sensor port includes a sensor or sensor array in communication with the control system 400. For example, each EHR port 114-X and each load sensor port may include a pressure transducer arranged in communication with the control system 400.

In some embodiments, the hydraulic system 110 includes a power beyond system 118 that provides a full flow of hydraulic power to an external implement coupled to the vehicle 10. In some embodiments, the power beyond system 118 includes a first power beyond port 118-1 and a second power beyond port 118-2. In some embodiments, more than two or less than two power beyond ports 118-X are provided on the vehicle 10. The power beyond system 118 may also include a load sense feature including one or more load sense ports. In some embodiments, each power beyond port 118-X and each load sensor port includes a sensor or sensor array in communication with the control system 400. For example, each power beyond port 118-X and each load sensor port may include a pressure transducer arranged in communication with the control system 400.

Smart Flow Dual Pump Hydraulic System

Figure 4:
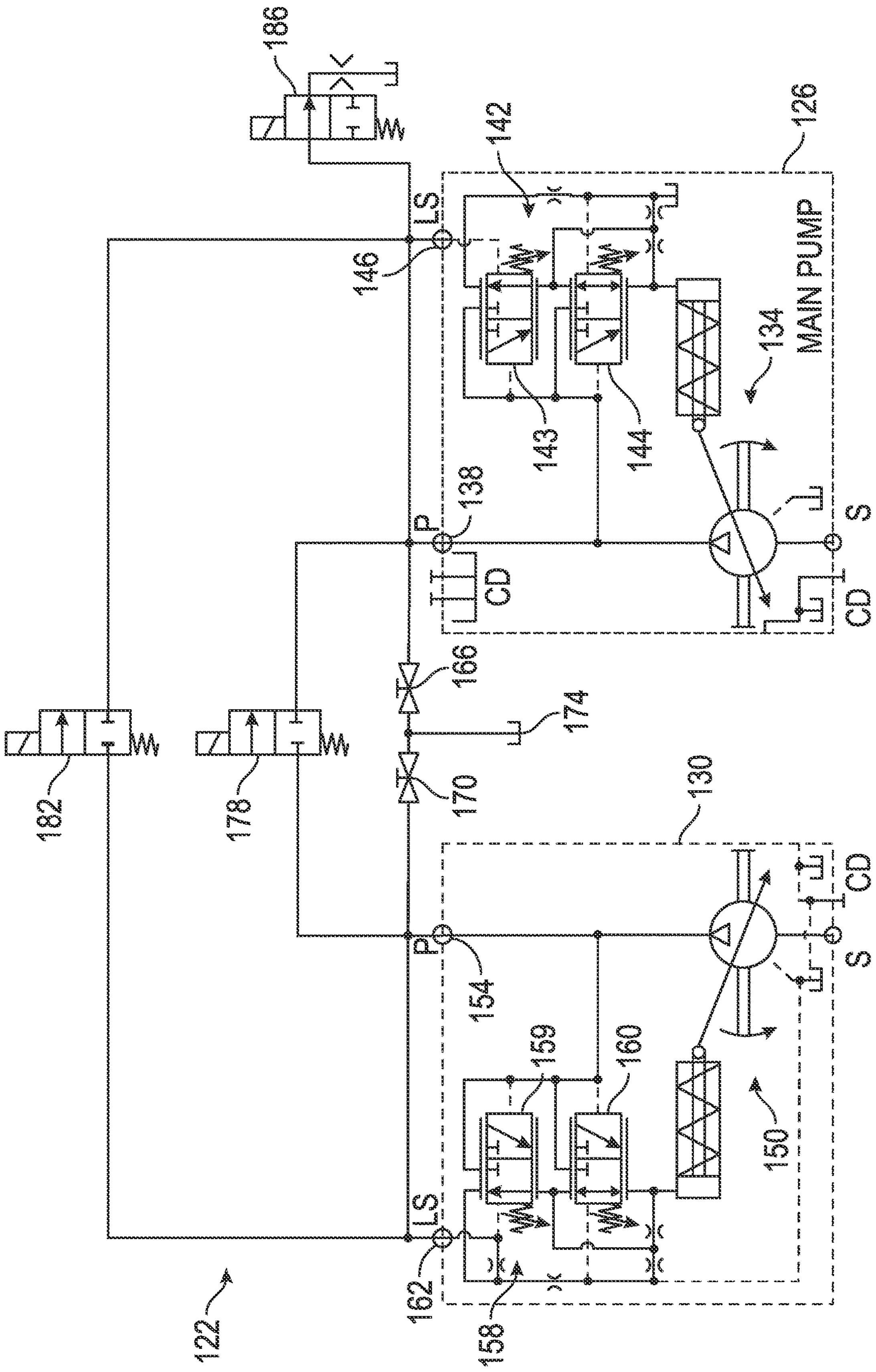
FIG. 4 is a schematic representation of a multiple pump hydraulic system for the vehicle of FIG. 1, according to an exemplary embodiment.

As shown in FIG. 4, the hydraulic system 110 shown in FIG. 3 can include a multiple pump hydraulic system 122 including a primary pump 126 and a twin or secondary pump 130. In some embodiments, the primary pump 126 provides a maximum output of eighty-five cubic centimeters per revolution (85 cc/rev). In some embodiments, the secondary pump 130 provides a maximum output of forty-five cubic centimeters per revolution (45 cc/rev).

The primary pump 126 and the secondary pump 130 can be operated in a combine flow mode and a separate flow mode. In the combined flow mode, also called a serial mode, the primary pump 126 and the secondary pump 130 work in tandem to provide hydraulic system flow to the EHR system 114 and/or the power beyond system 118. In the combined mode, when hydraulic pressure is desired (e.g., as dictated by the load sense system of the EHR system 114 and/or the power beyond system 118) both the primary pump 126 and the secondary pump 130 operate to provide hydraulic fluid flow and power.

In the separate flow mode, also called a parallel mode, the primary pump 126 and the secondary pump 130 operate independently and the primary pump 126 may be used to service a first portion of the hydraulic system 110 (e.g., the EHR ports 114-1 through 114-3 and power beyond port 118-1) and the secondary pump 130 may be used to service a second portion of the hydraulic system 110 (e.g., the EHR ports 114-4 through 114-6 and power beyond port 118-2). In some embodiments, the return flow from the primary pump 126 and ports associated with the primary pump 126 may combine with return flow from the secondary pump 130 and ports associated with the secondary pump 130.

The multiple pump hydraulic system 122 provides a user selectable system that operates in the combined flow mode and the separate flow mode. The use of the combined flow mode or the separate flow mode may be desirable based on how the vehicle 10 is being used and the ability to switch between the combined flow mode and the separate flow mode improves system efficiencies. Typical tractors are arranged in only one of a combined flow mode or a separate flow mode and it is difficult to switch between. As a result, operators of such vehicles do not switch pump configurations and therefore operate vehicles at reduced efficiencies compared to the multiple pump hydraulic system 122. The multiple pump hydraulic system 122 allows for a user to select a desired operational mode and automatically arrange the multiple pump hydraulic system 122 to provide either the combined flow mode or the separate flow mode. By enabling the operator to have control of the combined flow mode or the separate flow mode on the go it allows the hydraulic system 110 to be more robust for the application the vehicle 10 is being used in.

The primary pump 126 of the multiple pump hydraulic system 122 includes a primary variable displacement pump system 134 fluidly coupled to a sump and providing pressurized hydraulic fluid to a primary pressure port 138. The displacement of the primary variable displacement pump system 134 is controlled by a primary load sense system 142 in fluid communication with a primary load sense port 146. In some embodiments, the primary load sense system 142 includes two spool valves, a first primary spool 143 and a second primary spool 144, that control operation of a displacement actuator (e.g., a swashplate actuator, etc.). In some embodiments, the primary load sense port 146 is fluidly coupled via load sense pilot ports to the first primary spool 143 and to the second primary spool 144, and the primary pressure port 138 is fluidly coupled via pressure pilot ports to the first primary spool 143 and to the second primary spool 144. A pressure differential between the primary pressure port 138 and the primary load sense port 146 is used to control the displacement of the primary variable displacement pump system 134 via the displacement actuator. In some embodiments, the primary load sense system 142 includes adjustable spring returns that can be used to tune the pressure differential at which the first primary spool 143 and the second primary spool 144 switch and thereby the output pressure of the primary variable displacement pump system 134.

The secondary pump 130 of the multiple pump hydraulic system 122 includes a secondary variable displacement pump system 150 fluidly coupled to a sump (e.g., the same sump used by the primary variable displacement pump system 134) and providing pressurized hydraulic fluid to a secondary pressure port 154. The displacement of the secondary variable displacement pump system 150 is controlled by a secondary load sense system 158 in fluid communication with a secondary load sense port 162. In some embodiments, the secondary load sense system 158 includes two spool valves, a first secondary spool 159 and a second secondary spool 160, that control operation of a displacement actuator (e.g., a swashplate actuator, etc.). In some embodiments, the secondary load sense port 162 is fluidly coupled via load sense pilot port to the first secondary spool 159 and to the second secondary spool 160, and the secondary pressure port 154 is fluidly coupled via pressure pilot ports to the first secondary spool 159 and to the second secondary spool 160. A pressure differential between the secondary pressure port 154 and the secondary load sense port 162 is used to control the displacement of the secondary variable displacement pump system 150 via the displacement actuator. In some embodiments, the secondary load sense system 158 includes adjustable spring returns that can be used to tune the pressure differential at which the first secondary spool 159 and the second secondary spool 160 switch and thereby the output pressure of the secondary variable displacement pump system 150.

A primary load 166 is coupled to the primary pressure port 138 of the primary pump 126. In some embodiments, the primary load 166 includes EHR ports 114-1 through 114-3 and power beyond port 118-1. In some embodiments, the primary load 166 includes other loads, or less loads as desired. For example, the primary load 166 may include hydraulic loads of the vehicle 10 not related to external implements.

A secondary load 170 is coupled to the secondary pressure port 154 of the secondary pump 130. In some embodiments, the secondary load 170 includes EHR ports 114-4 through 114-6 and power beyond port 118-2. In some embodiments, the secondary load 170 includes other loads, or less loads as desired. For example, the secondary load 170 may include hydraulic loads of the vehicle 10 not related to external implements.

A common return 174 is coupled to the primary load 166 and the secondary load 170 and returns hydraulic fluid to the sump of the multiple pump hydraulic system 122. In some embodiments, the primary pump 126 and the secondary pump 130 may include separate sumps, as desired.

A crossover pressure controller 178 is coupled between the primary pressure port 138 and the secondary pressure port 154. In some embodiments, the crossover pressure controller 178 includes a spring return, solenoid actuated, 2-way, 2-position spool valve. In a separate pressure position (shown in FIG. 4), flow is inhibited between the primary pressure port 138 and the secondary pressure port 154. In a combined pressure position, the solenoid actuates the spool against a bias of the spring return and provides flow between the primary pressure port 138 and the secondary pressure port 154. In some embodiments, the spring return biases the crossover pressure controller 178 toward the combined pressure position.

A crossover load sense controller 182 is coupled between the primary load sense port 146 and the secondary load sense port 162. In some embodiments, the crossover load sense controller 182 includes a spring return, solenoid actuated, 2-way, 2-position spool valve. In a separate load sense position (shown in FIG. 4), flow is inhibited between the primary load sense port 146 and the secondary load sense port 162. In a combined load sense position, the solenoid actuates the spool against a bias of the spring return and provides flow between the primary load sense port 146 and the secondary load sense port 162. In some embodiments, the spring return biases the crossover load sense controller 182 toward the combined load sense position.

A load sense bleed controller 186 is coupled to the primary load sense port 146. In some embodiments, the load sense bleed controller 186 includes a spring return, solenoid actuated, 2-way, 2-position spool valve. In a separate bleed position (shown in FIG. 4), flow is provided between the primary load sense port 146 and the common return 174 or the sump. In a combined bleed position, the solenoid actuates the spool against a bias of the spring return and inhibits flow between the primary load sense port 146 and common return 174. In some embodiments, the spring return biases the load sense bleed controller 186 toward the combined bleed position.

In the separate flow mode (shown in FIG. 4), the crossover pressure controller 178 is arranged in the separate pressure position and flow is inhibited between the primary pressure port 138 and the secondary pressure port 154; the crossover load sense controller 182 is arranged in the separate load sense position and flow is inhibited between the primary load sense port 146 and the secondary load sense port 162; and the load sense bleed controller 186 is arranged in the separate bleed position and flow is provided between the primary load sense port 146 and the common return 174 or the sump. In the separate flow mode, the primary pump 126 and the secondary pump 130 each regulate and provide the pressure and flow of hydraulic fluid set by the operator, and load sense and load sense bleed operate separately for the primary pump 126 and the secondary pump 130 with a combined common return 174.

In the combined flow mode, the crossover pressure controller 178 is arranged in the combined pressure position and flow is provided between the primary pressure port 138 and the secondary pressure port 154; the crossover load sense controller 182 is arranged in the combined load sense position and flow is provided between the primary load sense port 146 and the secondary load sense port 162; and the load sense bleed controller 186 is arranged in the combined bleed position and flow is inhibited between the primary load sense port 146 and the common return 174 or the sump. In the combined flow mode, the primary pressure port 138 and the secondary pressure port 154 are coupled (e.g., are equal in pressure), and the primary load sense port 146 and the secondary load sense port 162 are coupled (e.g., are equal in pressure). The load sense bleed controller 186 is blocked so there is a common bleed through the secondary pump 130.

Mechanically Controlled Hydraulic Pump Power Management

Figure 5:
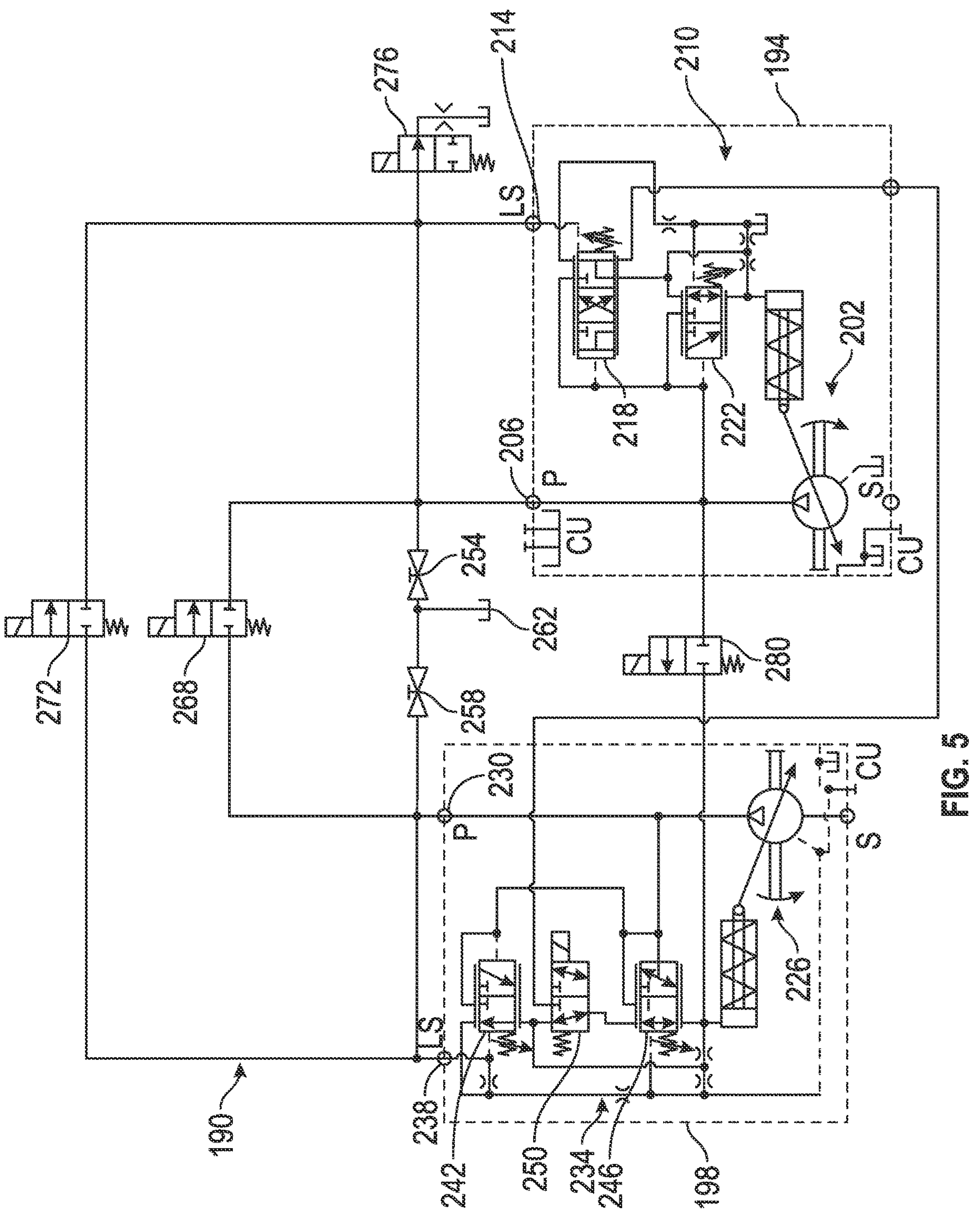
FIG. 5 is a schematic representation of a multiple pump hydraulic system for the vehicle of FIG. 1, according to an exemplary embodiment.

As shown in FIG. 5, the hydraulic system 110 shown in FIG. 3 can include a multiple pump hydraulic system 190 including a primary pump 194 and a twin or secondary pump 198. In some embodiments, the primary pump 194 provides a maximum output of eighty-five cubic centimeters per revolution (85 cc/rev). In some embodiments, the secondary pump 198 provides a maximum output of forty-five cubic centimeters per revolution (45 cc/rev). The demand of the vehicle 10 does not always require the output from all the pumps of the multiple pump hydraulic system 190 depending on the work scenario or activities of the vehicle 10. The multiple pump hydraulic system 190 mechanically senses when a load (e.g., connected to the EHR system 114 or the power beyond system 118) requires more power and which pumps (e.g., the primary pump 194 and/or the secondary pump 198) to load in order to complete the required work.

Typical vehicles with a dual pump system maintain a margin of pressure delta between a pressure port and a load sense port in order for a pressure compensator to operate the load sense function of the system pumps. The margin of pressure delta is directly related to an efficiency of the pump system. The multiple pump hydraulic system 190 includes additional features beyond a typical pressure compensator and load sense system thereby making the multiple pump hydraulic system 190 more efficient and improving fuel economy of the vehicle 10.

The primary pump 194 of the multiple pump hydraulic system 190 includes a primary variable displacement pump system 202 fluidly coupled to a sump and providing pressurized hydraulic fluid to a primary pressure port 206. The displacement of the primary variable displacement pump system 202 is controlled by a primary load sense system 210 in fluid communication with a primary load sense port 214. In some embodiments, the primary load sense system 210 includes two spool valves, a first primary spool 218 and a second primary spool 222, that control operation of a displacement actuator (e.g., a swashplate actuator, etc.) primary variable displacement pump system 202. In some embodiments, the primary load sense port 214 is fluidly coupled via a load sense pilot port to the first primary spool 218, and the primary pressure port 206 is fluidly coupled via pressure pilot ports to the first primary spool 218 and to the second primary spool 222.

In some embodiments, the first primary spool 218 is a dual pilot, spring biased, three-position, four-way spool valve and includes: a first position (e.g., leftmost in FIG. 5) that sends a destroke signal (e.g., a destroke hydraulic pressure) to both the primary pump 194 and the secondary pump 198; a second position (e.g., center in FIG. 5) that sends the destroke signal (e.g., the destroke hydraulic pressure) to only the secondary pump 198; and a third position (e.g., rightmost in FIG. 5) that inhibits the destroke signal (e.g., does not supply the destroke hydraulic pressure) to the primary pump 194 and the secondary pump 198 (e.g., both the primary pump 194 and the secondary pump 198 are at full stroke).

In some embodiments, the second primary spool 222 is a dual pilot, spring biased, two-position, three-way spool valve and includes a first position (e.g., leftmost in FIG. 5) that destrokes the primary pump 194; and a second position (e.g., rightmost in FIG. 5) that provides full stroke of the primary pump 194.

A pressure differential between the primary pressure port 206 and the primary load sense port 214 is used to control the displacement of the primary variable displacement pump system 202 via the displacement actuator. In some embodiments, the primary load sense system 210 includes adjustable spring returns that can be used to tune the pressure differential at which the first primary spool 218 and the second primary spool 222 switch and thereby the output pressure of the primary variable displacement pump system 202.

The secondary pump 198 of the multiple pump hydraulic system 190 includes a secondary variable displacement pump system 226 fluidly coupled to a sump (e.g., the same sump used by the primary variable displacement pump system 202) and providing pressurized hydraulic fluid to a secondary pressure port 230. The displacement of the secondary variable displacement pump system 226 is controlled by a secondary load sense system 234 in fluid communication with a secondary load sense port 238. In some embodiments, the secondary load sense system 234 includes three spool valves, a first secondary spool 242 a second secondary spool 246, and a power management spool 250, that control operation of a displacement actuator (e.g., a swashplate actuator, etc.) of the secondary variable displacement pump system 226. In some embodiments, the secondary load sense port 238 is fluidly coupled via load sense pilot ports to the first secondary spool 242 and to the second secondary spool 246, and the secondary pressure port 230 is fluidly coupled via pressure pilot ports to the first secondary spool 242 and to the second secondary spool 246.

The first secondary spool 242 is a dual pilot, spring biased, three-way, two-position spool valve and includes a first position (e.g., leftmost in FIG. 5) that provides a full stroke of the secondary pump 198, and a second position (e.g., rightmost in FIG. 5) that destrokes the secondary pump 198.

The second secondary spool 246 is a is a dual pilot, spring biased, three-way, two-position spool valve and includes a first position (e.g., leftmost in FIG. 5) that provides a full stroke of the secondary pump 198, and a second position (e.g., rightmost in FIG. 5) that destrokes the secondary pump 198.

The power management spool 250 is a solenoid operated, spring biased, three-way, two-position spool valve and includes a first position (e.g., leftmost in FIG. 5) that provides an independent operating mode where the first primary spool 218 and the second primary spool 222 control load sense operations for the primary pump 194 and the first secondary spool 242 and the second secondary spool 246 control load sense operations for the secondary pump 198. In some embodiments, the spring bias provides a normal operating position in the first position and the solenoid is arranged to overcome the spring bias when energized. The power management spool 250 also includes a second position (e.g., rightmost in FIG. 5) that provides a power management mode where the first secondary spool 242 is isolated and the destroke signal (e.g., the destroke hydraulic pressure) is provided from the first primary spool 218 to the second secondary spool 246 via the power management spool 250, thereby providing load sense operations for the secondary pump 198 that are dictated by the primary load sense system 210 of the primary pump 194.

When the secondary load sense system 234 is operating in the independent operating mode, a pressure differential between the secondary pressure port 230 and the secondary load sense port 238 is used to control the displacement of the secondary variable displacement pump system 226 via the displacement actuator. In some embodiments, the secondary load sense system 234 includes adjustable spring returns that can be used to tune the pressure differential at which the first secondary spool 242 and the second secondary spool 246 switch and thereby the output pressure of the secondary variable displacement pump system 226.

A primary load 254 is coupled to the primary pressure port 206 of the primary pump 194. In some embodiments, the primary load 254 includes EHR ports 114-1 through 114-3 and power beyond port 118-1. In some embodiments, the primary load 254 includes base loads (e.g., steering, brakes, regulated circuit, etc.), more loads, or less loads, as desired. For example, the primary load 254 may include base hydraulic loads of the vehicle 10 not related to external implements.

A secondary load 258 is coupled to the secondary pressure port 230 of the secondary pump 198. In some embodiments, the secondary load 258 includes EHR ports 114-4 through 114-6 and power beyond port 118-2. In some embodiments, the secondary load 258 includes other loads, or less loads as desired. For example, the secondary load 258 may include hydraulic loads of the vehicle 10 not related to external implements.

A common return 262 is coupled to the primary load 254 and the secondary load 258 and returns hydraulic fluid to the sump of the multiple pump hydraulic system 190. In some embodiments, the primary pump 194 and the secondary pump 198 may include separate sumps, as desired.

A crossover pressure controller 268 is coupled between the primary pressure port 206 and the secondary pressure port 230. In some embodiments, the crossover pressure controller 268 includes a spring return, solenoid actuated, 2-way, 2-position spool valve. In a separate pressure position (shown in FIG. 5), flow is inhibited between the primary pressure port 206 and the secondary pressure port 230. In a combined pressure position, the solenoid actuates the spool against a bias of the spring return and provides flow between the primary pressure port 206 and the secondary pressure port 230. In some embodiments, the spring return biases the crossover pressure controller 268 toward the combined pressure position.

A crossover load sense controller 272 is coupled between the primary load sense port 214 and the secondary load sense port 238. In some embodiments, the crossover load sense controller 272 includes a spring return, solenoid actuated, 2-way, 2-position spool valve. In a separate load sense position (shown in FIG. 5), flow is inhibited between the primary load sense port 214 and the secondary load sense port 238. In a combined load sense position, the solenoid actuates the spool against a bias of the spring return and provides flow between the primary load sense port 214 and the secondary load sense port 238. In some embodiments, the spring return biases the crossover load sense controller 272 toward the combined load sense position.

A load sense bleed controller 276 is coupled to the primary load sense port 214. In some embodiments, the load sense bleed controller 276 includes a spring return, solenoid actuated, 2-way, 2-position spool valve. In a separate bleed position (shown in FIG. 5), flow is provided between the primary load sense port 214 and the common return 262 or the sump. In a combined bleed position, the solenoid actuates the spool against a bias of the spring return and inhibits flow between the primary load sense port 214 and common return 262. In some embodiments, the spring return biases the load sense bleed controller 276 toward the combined bleed position.

A destroke controller 280 is coupled between the primary pressure port 206 and the displacement actuator (e.g., a swashplate actuator, etc.) of the secondary variable displacement pump system 226. The destroke controller 280 includes a spring return, solenoid actuated two-way, two-position spool valve. When the solenoid is energized, the spool is pushed against the bias of the return spring into a destroked position and flow is provided from the pressurized output of the primary pump 194 via the primary pressure port 206 to the displacement actuator of the secondary variable displacement pump system 226 such that the secondary pump 198 is destroked. When the solenoid is not energized, the spring bias moves the spool into an isolated position (as shown in FIG. 5) and flow is inhibited between the pressurized output of the primary pump 194 via the primary pressure port 206 to the displacement actuator of the secondary variable displacement pump system 226 such that the stroke of the secondary pump 198 is controlled via the secondary load sense system 234. In some embodiments, the destroking controller can normally be in the destroking position, or be actuated in a different way.

In operation, the primary pump 194 and the secondary pump 198 of the multiple pump hydraulic system 190 can be operated in a combine flow mode, a power management combined flow mode, a separate flow mode, and a destroked separate flow mode. The use of the combine flow mode, the power management combined flow mode, the separate flow mode, and/or the destroked separate flow mode may be desirable based on how the vehicle 10 is being used, and the ability to switch modes improves system efficiencies. The multiple pump hydraulic system 190 allows for a user to select a desired operational mode and automatically arrange the multiple pump hydraulic system 190.

In the combined flow mode, also called a serial mode, the primary pump 194 and the secondary pump 198 work in tandem to provide hydraulic system flow to the EHR system 114 and/or the power beyond system 118. In the combined flow mode, when hydraulic pressure is desired (e.g., as dictated by the load sense system of the EHR system 114 and/or the power beyond system 118) both the primary pump 194 and the secondary pump 198 may be operated to provide hydraulic fluid flow and power. In the combined flow mode, the crossover pressure controller 268 is arranged in the combined pressure position and flow is provided between the primary pressure port 206 and the secondary pressure port 230; the crossover load sense controller 272 is arranged in the combined load sense position and flow is provided between the primary load sense port 214 and the secondary load sense port 238; and the load sense bleed controller 276 is arranged in the combined bleed position and flow is inhibited between the primary load sense port 214 and the common return 262 or the sump. In the combined flow mode, the primary pressure port 206 and the secondary pressure port 230 are coupled (e.g., are equal in pressure), and the primary load sense port 214 and the secondary load sense port 238 are coupled (e.g., are equal in pressure). The load sense bleed controller 276 is blocked so there is a common bleed through the secondary pump 198. The power management controller 250 is arranged in the first position so that the secondary load sense system 234 of the secondary pump 198 controls the destroking of the secondary pump 198. The destroke controller 280 is arranged in the isolated position such that the secondary pump 198 provides pressurized hydraulic fluid according to the secondary load sense system 234. In some embodiments, the multiple pump hydraulic system 190 is used in the combined flow mode when the control system 400 senses that one or more of the EHR ports 114-4 through 114-6 or the power beyond port 118-2 is in use.

In the power management combined flow mode, the multiple pump hydraulic system 190 is arranged similarly to the combined flow mode. Additionally, the power management spool 250 is arranged in the second position so that the first secondary spool 242 is isolated and the destroke signal (e.g., the destroke hydraulic pressure) is provided from the first primary spool 218 to the second secondary spool 246 via the power management spool 250, thereby providing load sense operations for the secondary pump 198 that are dictated by the primary load sense system 210 of the primary pump 194. The power management spool 250 is controlled by the control system 400. When arranged in the power management combined flow mode, the first primary spool 218 of the primary load sense system 210 controls the stroke of both the primary pump 194 and the secondary pump 198. In the first position (e.g., leftmost in FIG. 5), the destroke signal (e.g., a destroke hydraulic pressure) is sent to both the primary pump 194 and the secondary pump 198 so that both pumps are destroked. In the second position (e.g., center in FIG. 5) the destroke signal is sent to only the secondary pump 198 so that the primary pump 194 operates normally with load sense control and the secondary pump 198 is destroked. In the third position (e.g., rightmost in FIG. 5), the destroke signal is inhibited or isolated to the primary pump 194 and the secondary pump 198 so that both pumps operate at full stroke.

In the separate flow mode, also called a parallel mode, the primary pump 194 and the secondary pump 198 operate independently and the primary pump 194 may be used to service a first portion of the hydraulic system 110 (e.g., the EHR ports 114-1 through 114-3 and power beyond port 118-1) and the secondary pump 198 may be used to service a second portion of the hydraulic system 110 (e.g., the EHR ports 114-4 through 114-6 and power beyond port 118-2). In some embodiments, the return flow from the primary pump 194 and ports associated with the primary pump 194 may combine with return flow from the secondary pump 198 and ports associated with the secondary pump 198. In the separate flow mode (shown in FIG. 5), the crossover pressure controller 268 is arranged in the separate pressure position and flow is inhibited between the primary pressure port 206 and the secondary pressure port 230; the crossover load sense controller 272 is arranged in the separate load sense position and flow is inhibited between the primary load sense port 214 and the secondary load sense port 238; the load sense bleed controller 276 is arranged in the separate bleed position and flow is provided between the primary load sense port 214 and the common return 262 or the sump; and the power management spool 250 is arranged in the first position (e.g., with the solenoid de-energized) so that load sense functions are provided independently by the primary pump 194 and the secondary pump 198. In the separate flow mode, the primary pump 194 and the secondary pump 198 each regulate and provide the pressure and flow of hydraulic fluid set by the operator, and load sense and load sense bleed operate separately for the primary pump 194 and the secondary pump 198 with a combined common return 262.

In the destroked separate flow mode, the multiple pump hydraulic system 190 is arranged similarly to the separate flow mode. Additionally, power is provided to the solenoid of the destroke controller 280 so that the spool of the destroke controller 280 is arranged in the destroke position and flow is provided from the pressurized output of the primary pump 194 via the primary pressure port 206 to the displacement actuator of the secondary variable displacement pump system 226 such that the secondary pump 198 is destroked. In some embodiments, the control system 400 provides power to the solenoid of the destroke controller 280 when no load is detected, or nothing is connected to the EHR ports 114-4 through 114-6 and/or the power beyond port 118-2. In some embodiments, when loads are connected to the EHR ports 114-4 through 114-6 and/or the power beyond port 118-2, the solenoid of the destroke controller 280 is not energized and the separate flow mode is utilized. The destroked separate flow mode can be implemented by the control system 400 based on user inputs (e.g., the user selects via the operator interface 40 that no loads are connected to EHR ports 114-4 through 114-6 and/or the power beyond port 118-2) or based on automatic recognition (e.g., the control system 400 recognizes via one or more sensors, physical or virtual, that no loads are connected to the EHR ports 114-4 through 114-6 and/or the power beyond port 118-2).

Electronically Controlled Pump Power Management

Figure 6:
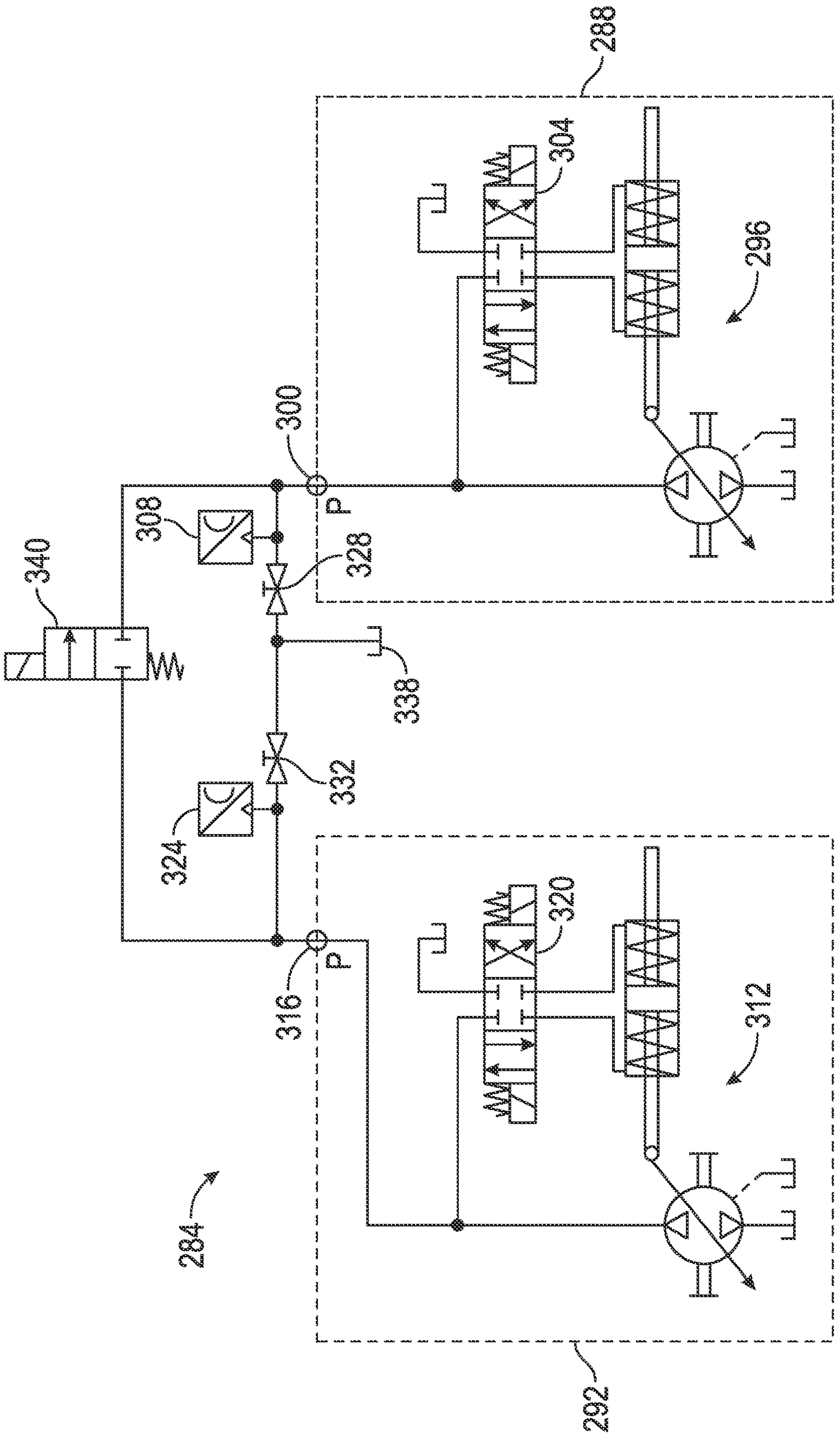
FIG. 6 is a schematic representation of a multiple pump hydraulic system for the vehicle of FIG. 1, according to an exemplary embodiment.

As shown in FIG. 6, the hydraulic system 110 shown in FIG. 3 can include a multiple pump hydraulic system 284 including a primary pump 288 and a twin or secondary pump 292. In some embodiments, the primary pump 288 is an electrohydraulic control pump that provides a maximum output of eighty-five cubic centimeters per revolution (85 cc/rev). In some embodiments, the secondary pump 292 is an electrohydraulic control pump that provides a maximum output of forty-five cubic centimeters per revolution (45 cc/rev).

The primary pump 288 and the secondary pump 292 can be operated in a combine flow mode and a separate flow mode. In the combined flow mode, also called a serial mode, the primary pump 288 and the secondary pump 292 work in tandem to provide hydraulic system flow to the EHR system 114 and/or the power beyond system 118. In the combined mode, when hydraulic pressure is desired both the primary pump 288 and the secondary pump 292 operate to provide hydraulic fluid flow and power.

In the separate flow mode, also called a parallel mode, the primary pump 288 and the secondary pump 292 operate independently and the primary pump 288 may be used to service a first portion of the hydraulic system 110 (e.g., the EHR ports 114-1 through 114-3 and power beyond port 118-1) and the secondary pump 292 may be used to service a second portion of the hydraulic system 110 (e.g., the EHR ports 114-4 through 114-6 and power beyond port 118-2). In some embodiments, the return flow from the primary pump 288 and ports associated with the primary pump 288 may combine with return flow from the secondary pump 292 and ports associated with the secondary pump 292.

The multiple pump hydraulic system 284 provides a user selectable system that operates in the combined flow mode and the separate flow mode. The use of the combined flow mode or the separate flow mode may be desirable based on how the vehicle 10 is being used and the ability to switch between the combined flow mode and the separate flow mode improves system efficiencies. The multiple pump hydraulic system 284 allows for a user to select a desired operational mode (e.g., from a GUI presented on the operator interface 40, from a selection of switches or buttons, etc.) and automatically arrange the multiple pump hydraulic system 284 to provide either the combined flow mode or the separate flow mode. By enabling the operator to have control of the combined flow mode or the separate flow mode on the go it allows the hydraulic system 110 to be more robust for the application the vehicle 10 is being used in.

The primary pump 288 of the multiple pump hydraulic system 284 includes a primary variable displacement pump system 296 fluidly coupled to a sump and providing pressurized hydraulic fluid to a primary pressure port 300. The displacement of the primary variable displacement pump system 296 is controlled by a primary electrohydraulic control system 304 in fluid communication with a primary load sensor 308. In some embodiments, the primary electrohydraulic control system 304 includes a spool valve that controls operation of a displacement actuator (e.g., a swashplate actuator, etc.). In some embodiments, the primary load sensor 308 is an electronic load sense sensor (e.g., a pressure transducer, etc.) fluidly coupled to the primary pressure port 300. A primary pressure determined by the primary load sensor 308 is used by the control system 400 to control the displacement of the primary variable displacement pump system 296 via the primary electrohydraulic control system 304 interacting with the displacement actuator. In some embodiments, the primary electrohydraulic control system 304 includes center spring returns that center the spool of the primary electrohydraulic control system 304 and inhibit flow therethrough. The primary electrohydraulic control system 304 includes two solenoids that are selectively energized by the control system 400 to shift the spool and stroke or destroke the primary pump 288.

The secondary pump 292 of the multiple pump hydraulic system 284 includes a secondary variable displacement pump system 312 fluidly coupled to a sump (e.g., the same sump used by the primary variable displacement pump system 296) and providing pressurized hydraulic fluid to a secondary pressure port 316. The displacement of the secondary variable displacement pump system 312 is controlled by a secondary electrohydraulic control system 320 in fluid communication with a secondary load sensor 324. In some embodiments, the secondary electrohydraulic control system 320 includes a spool valve that controls operation of a displacement actuator (e.g., a swashplate actuator, etc.). In some embodiments, the secondary load sensor 324 is an electronic load sense sensor (e.g., a pressure transducer, etc.) fluidly coupled to the secondary pressure port 316. A secondary pressure determined by the secondary load sensor 324 is used by the control system 400 to control the displacement of the secondary variable displacement pump system 312 via the secondary electrohydraulic control system 320 interacting with the displacement actuator. In some embodiments, the secondary electrohydraulic control system 320 includes center spring returns that center the spool of the secondary electrohydraulic control system 320 and inhibit flow therethrough. The secondary electrohydraulic control system 320 includes two solenoids that are selectively energized by the control system 400 to shift the spool and stroke or destroke the secondary pump 292.

A primary load 328 is coupled to the primary pressure port 300 of the primary pump 288. In some embodiments, the primary load 328 includes EHR ports 114-1 through 114-3 and power beyond port 118-1. In some embodiments, the primary load 328 includes other loads, or less loads as desired. For example, the primary load 328 may include hydraulic base loads of the vehicle 10 (e.g., steering brakes, etc.) not related to external implements.

A secondary load 332 is coupled to the secondary pressure port 316 of the secondary pump 292. In some embodiments, the secondary load 332 includes EHR ports 114-4 through 114-6 and power beyond port 118-2. In some embodiments, the secondary load 332 includes other loads, or less loads as desired. For example, the secondary load 332 may include hydraulic loads of the vehicle 10 not related to external implements.

A common return 338 is coupled to the primary load 328 and the secondary load 332 and returns hydraulic fluid to the sump of the multiple pump hydraulic system 284. In some embodiments, the primary pump 288 and the secondary pump 292 may include separate sumps, as desired.

A crossover pressure controller 340 is coupled between the primary pressure port 300 and the secondary pressure port 316. In some embodiments, the crossover pressure controller 340 includes a spring return, solenoid actuated, 2-way, 2-position spool valve. In a separate pressure position (shown in FIG. 6), flow is inhibited between the primary pressure port 300 and the secondary pressure port 316. In a combined pressure position, the solenoid actuates the spool against a bias of the spring return and provides flow between the primary pressure port 300 and the secondary pressure port 316. In some embodiments, the spring return biases the crossover pressure controller 340 toward the combined pressure position.

In the separate flow mode (shown in FIG. 6), the crossover pressure controller 340 is arranged in the separate pressure position and flow is inhibited between the primary pressure port 300 and the secondary pressure port 316. In the separate flow mode, the primary pump 288 is pressure regulated by the primary electrohydraulic control system 304 and the secondary pump 292 is pressure regulated by the secondary electrohydraulic control system 320. In the separate flow mode, the multiple pump hydraulic system 284 provides the pressure and flow of hydraulic fluid set by the operator, and load sense and load sense bleed separately for the primary pump 288 and the secondary pump 292 with a combined common return 338.

In the combined flow mode, the crossover pressure controller 340 is arranged in the combined pressure position and flow is provided between the primary pressure port 300 and the secondary pressure port 316. In the combined flow mode, the primary pressure port 300 and the secondary pressure port 316 are coupled (e.g., are equal in pressure), and control system 400 controls operation of the primary pump 288 and the secondary pump 292 based on feedback form the primary load sensor 308 and the secondary load sensor 324. In some embodiments, the control system 400 controls the displacement of the primary pump 288 and the secondary pump 292 to meet load demands. If the primary pump 288 is capable of meeting the load demands, the control system 400 destrokes the secondary pump 292 via the secondary electrohydraulic control system 320 to improve system efficiency thereby reducing fuel consumption of the vehicle 10.

The load demand of the vehicle 10 does not always require the output from all pumps of the multiple pump hydraulic system 284 depending on the work scenario. The control system 400 is structured to electronically sense when the load requires more power and which pumps (e.g., the primary pump 288 and/or the secondary pump 292) to load in order to complete the required work.

In operation, the control system 400 recognizes when couplers are connected to the EHR system 114 and/or the power beyond system 118. Based on the load demand from the base hydraulic functions of the vehicle 10, the EHR system 114, and the power beyond system 118, the multiple pump hydraulic system 284 modifies operation to meet the demand. The displacement of the primary pump 288 is controlled via the primary electrohydraulic control system 304, and the displacement of the secondary pump 292 is controlled via the secondary electrohydraulic control system 320 based on signals received from the primary load sensor 308 and the secondary load sensor 324.

When the solenoid of the crossover pressure controller 340 is energized and the spool is arranged in the combined pressure position, the combined flow mode is engaged, and flow is provided between the primary pressure port 300 and the secondary pressure port 316. During combined flow mode operation, the control system 400 operates the primary pump 288 using on feedback control based on the primary load sensor 308 and the secondary load sensor 324. When the load demand can be met by the primary pump 288 alone, as determined via the feedback, the control system 400 destrokes the secondary pump 292 and system efficiency is increased.

When the solenoid of the crossover pressure controller 340 is not energized, the spring return biases the spool is arranged in the separate flow position, the separate flow mode is engaged, and flow is inhibited between the primary pressure port 300 and the secondary pressure port 316. During separate flow mode operation, the control system 400 determines if a load is coupled to the EHR ports 114-4 through 114-6 and/or the power beyond port 118-2. If no connections are detected, or the operator indicates via the operator interface 40 that no loads are connected, then the control system 400 commands the secondary electrohydraulic control system 320 (e.g., via the solenoids) to destroke the secondary pump 292. If connections are detected, or the operator indicates via the operator interface 40 that loads are connected to the EHR ports 114-4 through 114-6 and/or the power beyond port 118-2, then the control system 400 commands the secondary electrohydraulic control system 320 (e.g., via the solenoids) to stoke the secondary pump 292 and provide pressurized hydraulic fluid. The primary electrohydraulic control system 304 controls stroking and destroking of the primary pump 288 during separate flow mode operation.

Enabling the operator of the vehicle 10 to have control of a combined or separated flow system on the go allows the multiple pump hydraulic system 284 to be more robust for the application the vehicle 10 is being used in. The additional power management modes increase efficiency in both combined flow mode and separate flow mode. The vehicle's 10 control system 400 can switch modes automatically based on sensed demands or based on operator selection via the operator interface. In some embodiments, the multiple pump hydraulic system 284 is implemented on an autonomous vehicle 10 and the control system 400 is integrated with a vehicle control system for the autonomous vehicle 10.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 400, etc.) as shown in the various exemplary embodiments is illustrative only. Additionally, any element disclosed in one embodiment may be incorporated or utilized with any other embodiment disclosed herein.

The invention claimed is:

1. A hydraulic system for a vehicle, the hydraulic system comprising:

a first hydraulic pump including a first displacement actuator and a first pressure port;

a first load sense system fluidly coupled to the first displacement actuator;

a second hydraulic pump including a second displacement actuator and a second pressure port;

a second load sense system fluidly coupled to the second displacement actuator; and a crossover pressure controller coupled between the first pressure port and the second pressure port, the crossover pressure controller reconfigurable between (a) a combined pressure configuration providing fluid communication between the first pressure port and the second pressure port and (b) a separate pressure configuration inhibiting fluid communication between the first pressure port and the second pressure port, wherein the crossover pressure controller is actuatable independent of the first load sense system and the second load sense system.

2. The hydraulic system of claim 1, further comprising a control system configured to reconfigure the crossover pressure controller between the combined pressure configuration and the separate pressure configuration based on at least one of an operator input, an automatic detection of load demand, or an automatic detection of an operational mode of the vehicle.

3. The hydraulic system of claim 1, wherein the first hydraulic pump includes a first load sense port, and wherein the second hydraulic pump includes a second load sense port, further comprising a crossover load sense controller coupled between the first load sense port and the second load sense port, the crossover load sense controller reconfigurable between (a) a combined load sense configuration providing fluid communication between the first load sense port and the second load sense port and (b) a separate load sense configuration inhibiting fluid communication between the first load sense port and the second load sense port.

4. The hydraulic system of claim 3, further comprising a load sense bleed controller coupled between the first load sense port and a return, the load sense bleed controller reconfigurable between (a) a combined bleed configuration inhibiting flow between the first load sense port and the return and (b) a separate bleed configuration providing flow between the first load sense port and the return.

5. The hydraulic system of claim 4, further comprising a destroking controller coupled between the first pressure port and the second displacement actuator, the destroking controller reconfigurable between (a) a stroked configuration inhibiting flow between the first pressure port and the second displacement actuator and (b) a destroked configuration providing flow between the first pressure port and the second displacement actuator.

6. The hydraulic system of claim 5, wherein the first load sense system includes a first load sense spool reconfigurable between (a) a first destroke configuration that sends a destroke signal to the first hydraulic pump and the second hydraulic pump, (b) a second destroke configuration that sends the destroke signal to only the second hydraulic pump, and a stroke position that inhibits the destroke signal being sent to the first hydraulic pump and the second hydraulic pump.

7. The hydraulic system of claim 6, further comprising a power management controller reconfigurable between (a) a first configuration that inhibits communication between the first load sense spool and the second displacement actuator and (b) a second configuration that provides communication between the first load sense spool and the second displacement actuator.

8. The hydraulic system of claim 7, further comprising a control system configured to reconfigure the crossover pressure controller, the crossover load sense controller, the load sense bleed controller, and the power management controller to selectively provide:

a combine flow mode with the first pressure port in communication with the second pressure port and the first load sense port in communication with the second load sense port;

a power management combined flow mode with both the first hydraulic pump and the second hydraulic pump controlled by the first load sense system;

a separate flow mode with the first pressure port isolated from the second pressure port and the first load sense port isolated from the second load sense port; and a destroked separate flow mode with the destroking controller arranged in the destroked configuration.

9. The hydraulic system of claim 1, wherein the first load sense system includes a first electrohydraulic actuator configured to facilitate controlling a first position of the first displacement actuator, and wherein the second load sense system includes a second electrohydraulic actuator configured to facilitate controlling a second position of the second displacement actuator.

10. The hydraulic system of claim 9, wherein the first electrohydraulic actuator includes a first solenoid and a second solenoid configured to control a first flow of hydraulic fluid to the first displacement actuator, and wherein the second electrohydraulic actuator includes a third solenoid and a fourth solenoid configured to control a second flow of hydraulic fluid to the second displacement actuator.

11. The hydraulic system of claim 10, further comprising:

a first load sensor positioned in fluid communication with the first pressure port, the first load sensor configured to transmit first information indicative of a first load on the first pressure port; and a second load sensor positioned in fluid communication with the second pressure port, the second load sensor configured to transmit second information indicative of a second load on the second pressure port.

12. The hydraulic system of claim 11, further comprising a control system configured to control at least one of the first solenoid, the second solenoid, the third solenoid, or the fourth solenoid based at least in part on at least one of the first information received from the first load sensor or the second information received from the second load sensor.

13. The hydraulic system of claim 1, further comprising a first load coupled to the first pressure port and a second load coupled to the second pressure port.

14. The hydraulic system of claim 13, wherein the first load includes a first plurality of electrohydraulic remote (EHR) ports and at least one first power beyond port, and wherein the second load includes a second plurality of EHR ports and at least one second power beyond port.

15. The hydraulic system of claim 13, wherein the second hydraulic pump is destroked when the second load has no load demand.

16. A hydraulic system for a vehicle, the hydraulic system comprising:

a first hydraulic pump including a first displacement actuator, a first pressure port, and a first load sense port;

a first load sense system fluidly coupled to the first displacement actuator;

a second hydraulic pump including a second displacement actuator, a second pressure port, and a second load sense port;

a second load sense system fluidly coupled to the second displacement actuator;

a crossover pressure valve positioned between the first pressure port and the second pressure port; and a crossover load sense valve positioned between the first load sense port and the second load sense port;

wherein the crossover pressure valve includes a first valve element and the crossover load sense valve includes a second valve element.

17. The hydraulic system of claim 16, wherein the first valve element and the second valve element are separately or independently actuatable.

18. The hydraulic system of claim 16, wherein the first valve element and the second valve element are movable relative to each other.

19. A hydraulic system for a vehicle, the hydraulic system comprising:

a first hydraulic pump including a first displacement actuator, a first pressure port, and a first load sense port;

a first load sense system fluidly coupled to the first displacement actuator;

a second hydraulic pump including a second displacement actuator, a second pressure port, and a second load sense port;

a second load sense system fluidly coupled to the second displacement actuator;

a crossover pressure valve coupled between the first pressure port and the second pressure port; and a crossover load sense valve separate from the crossover pressure valve, the crossover load sense valve coupled between the first load sense port and the second load sense port.

* * * * *